United States Patent [19]

van Deventer

[11] Patent Number: 5,327,278
[45] Date of Patent: Jul. 5, 1994

[54] OPTICAL TRANSMITTING AND RECEIVING SYSTEM HAVING POLARIZATION DIVERSITY IN EACH HYBRID CIRCUIT

[75] Inventor: Mattijs O. van Deventer, Leidschendam, Netherlands

[73] Assignee: Koninklijke Ptt Nederland N.V., Groningen, Netherlands

[21] Appl. No.: 832,089

[22] Filed: Feb. 6, 1992

[30] Foreign Application Priority Data

Feb. 19, 1991 [NL] Netherlands ............... 9100292

[51] Int. Cl.⁵ .............. H04B 10/00; H04B 10/06
[52] U.S. Cl. ................................... 359/156; 359/152; 359/192
[58] Field of Search ............... 359/113, 114, 122, 152, 359/154, 156, 157, 164, 173, 188, 191, 192, 195; 385/31, 32, 33, 34, 35, 36; 372/29, 31, 32, 703

[56] References Cited

U.S. PATENT DOCUMENTS

| | | | |
|---|---|---|---|
| 4,697,284 | 9/1987 | Bernard | 359/192 |
| 4,704,741 | 11/1987 | Shikada | 359/154 |
| 4,804,256 | 2/1989 | Wilson | 359/281 |
| 4,910,727 | 3/1990 | Fussganger | 359/114 |
| 5,037,202 | 8/1991 | Batchelder et al. | 356/364 |
| 5,084,779 | 1/1992 | Stanley | 359/154 |
| 5,115,332 | 4/1992 | Naito et al. | 359/189 |
| 5,146,359 | 9/1992 | Okoshi et al. | 359/189 |
| 5,152,597 | 10/1992 | Barnard | 359/283 |
| 5,247,382 | 9/1993 | Suzuki | 359/156 |

FOREIGN PATENT DOCUMENTS

| | | | |
|---|---|---|---|
| 322893A3 | 7/1989 | European Pat. Off. | H04B 9/00 |
| 2495864 | 6/1982 | France | H04E 10/12 |
| WO88/06745 | 9/1988 | PCT Int'l Appl. | G02F 1/09 |

Primary Examiner—Richard E. Chilcot, Jr.
Assistant Examiner—Rafael Bacares
Attorney, Agent, or Firm—Frishauf, Holtz, Goodman & Woodward

[57] ABSTRACT

An optical transmitting and receiving system for connection to an optical bidirectional transmission path comprises a transmitter and a pair of coherent receivers sharing a local oscillator. The transmitter and receiver and connected to the transmission path via a hybrid circuit. The hybrid circuit is provided with a first polarisation splitter, a nonreciprocal polarisation rotator and a second polarisation splitter. A connection of the first polarisation splitter and a connection of the second polarisation splitter form, respectively, the input connection for the transmitter and the bidirectional connection of the hybrid circuit. The input and output of the nonreciprocal polarisation rotator are connected between the first and second polarisation splitters. The receivers are connected to separate outputs of the polarisation splitters.

9 Claims, 1 Drawing Sheet

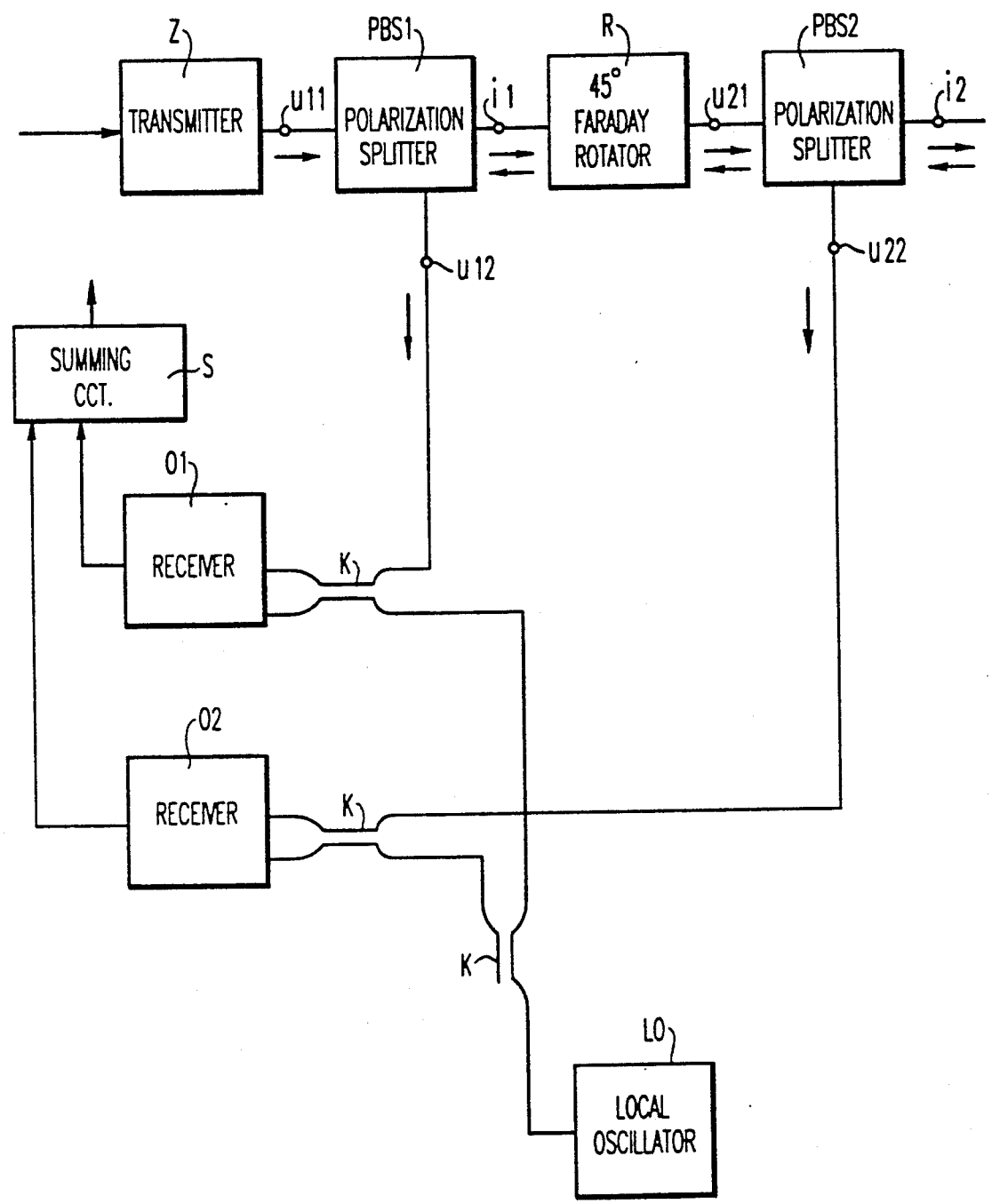

OPTICAL TRANSMITTING AND RECEIVING SYSTEM HAVING POLARIZATION DIVERSITY IN EACH HYBRID CIRCUIT

BACKGROUND OF THE INVENTION

Field of the Invention

The invention relates to an optical transmitting and receiving system comprising an optical bidirectional transmission path, a transmitter which hybrid circuit is provided with a first polarisation splitter, a nonreciprocal polarisation rotator and a second polarisation splitter, the first output of the first polarisation splitter and the input of the second polarisation splitter forming the input connection and the bidirectional connection, respectively, of the hybrid circuit and the input and output of the nonreciprocal polarisation rotator being respectively connected to the input of the first polarisation splitter and the first output of the second polarisation splitter.

DESCRIPTION OF THE RELATED ART

In the bidirectional use of an optical fibre, the outgoing and returning traffic have to be separated at both ends. This can be done with a 50/50 splitter. However, this produces a loss of 6 dB (a factor of 4) in signal for both directions, specifically 3 dB at the beginning as a result of the combination and 3 dB at the end as a result of the splitting.

A conventional better solution is to use an optical fork circuit in the form of a circulator. This is a nonreciprocal optical component having three or four ports, light fed to one port always emerging at the next port. A circulator has been described, for example, in the journal "The transactions of the IECE of Japan", volume E 64, No. 1, January 1981, pages 30 and 31. This component is based on the Faraday effect and comprises a Faraday rotator, two polarisation splitters, two mirrors and a half-lambda retarder, the alignment being very critical because of the splitting and combination of light paths. The transmitters and receivers are each connected to a port of the circulator, while the optical fibre is connected to another port thereof as bidirectional transmission path.

In optical fibre transmission it has been found that, for coherent receivers, the detected signal varies and may even occasionally be lost as a consequence of the time-dependent polarisation fluctuations at the output of the optical fibre.

Many solutions are known for this problem, such as, for example, polarisation diversity.

SUMMARY OF THE INVENTION

The object of the invention is to provide a transmitting and receiving system of the type mentioned at the outset, in which the two abovementioned problems are solved simultaneously in a simple way and with as few components as possible.

This object is achieved according to the invention in that each receiving circuit comprises two coherent receivers connected to a single local oscillator and the inputs of the coherent receivers are respectively connected to the second outputs of the polarisation splitters and the outputs of the coherent receivers are summed.

In this case, the function of the optical circulator and the function of the polarisation splitter in polarisation diversity are combined in a single optical circuit incorporating a Faraday rotator and two polarisation splitters, without critical alignment. A combination of the known circulator and polarisation diversity would require more components, namely three polarisation splitters, a Faraday rotator, two mirrors and a half-lambda retarder. Such a combination is, in addition, more complex because of the additional connection between the circulator and the polarisation diversity circuit and because of the critical alignment of the circulator.

It is known, moreover, that undesirable reflections to the transmitter are eliminated by using an optical isolator. As a result of making use of the invention, the requirements imposed on the isolator are less severe and such an isolator may even be dispensed with.

With the transmitting and receiving system according to the invention, three problems in an optical bidirectional network having coherent reception can thus be resolved simultaneously in a simple way, namely reflections to the transmitter (laser), polarisation fluctuations and loss-free combination of incoming and outgoing traffic. The system according to the invention incorporates only two polarisation splitters and one nonreciprocal polarisation rotator.

In an embodiment according to the invention, the polarisation rotation of the nonreciprocal polarisation rotator in the return direction is equal to the difference between the polarisation directions at the inputs of the polarisation splitter. This achieves the result that the isolation of undesirable reflections to the transmitter is optimum and, consequently, the transmission from the system connection to the receiver(s) is a maximum.

In this connection, the rotation of the nonreciprocal polarisation rotator is preferably 45°. Specifically, the 6 dB loss is completely avoided in that case, with the result that the transmission in the transmission direction is also optimum.

The connection between the transmitter and the first output of the first polarisation splitter, is a polarisation-maintaining optical fibre. Similarly, at least one connection between the second outputs of the first or second polarisation splitter, respectively, and the inputs of the coherent receivers is formed by a polarisation-maintaining optical fibre.

Three problems which are encountered in an optical transmitting and receiving system with coherent detection, and the known solutions therefor will first be dealt with.

The first problem is formed by undesirable reflections in the direction of the transmitter, which incorporates a laser. This problem is already as old as the invention of the laser itself. As a result of reflections from the outside, the laser starts to behave badly. The intensity noise increases, while a change in the line width and mode hopping occur, with the result that the laser exhibits an unstable behaviour.

The conventional solution is to use an optical isolator. This comprises in principle a series circuit of two polarisers with a Faraday-type polarisation rotator in between. The first polariser transmits light having a certain polarisation direction completely while light having a polarisation direction which is perpendicular to the first-named polarisation direction is completely extinguished. The so-called Faraday rotator, which is an optical nonreciprocal component, rotates the polarisation anticlockwise in one direction and clockwise in the other direction. In the transmission direction of the isolator, the polarisation rotates in such a way that all the light is transmitted. In the blocking direction, on the other hand, the polarisation rotates in such a way that all the light is extinguished.

Polarisation fluctuations in optical fibres form the second problem.

In transmission through an optical fibre it has been found that, with constant polarisation at the input of the optical fibre, the polarisation direction of the light at the output of the transmission section fluctuates as a function of time. The local oscillator of a coherent receiver has, however, a fixed polarisation direction. All this has the result that, if a transmission signal having a constant level and polarisation is applied, the amplitude of the signal detected in the coherent receiver will vary and will occasionally even be lost.

Many solutions for this problem are known, such as polarisation control, polarisation switching, polarisation scrambling, the use of polarisation-maintaining fibres and polarisation diversity. According to the last solution, the light received is split by means of a polarisation splitter into two components which are each applied to a separate coherent receiver, after which the output signals of the receivers are combined to form a final output signal. The solution described above for the second problem is described in a balanced version in the journal "Electronics Letters", 22 Oct. 1987, volume 23, No. 22, pages 1195 and 1196.

The combination of incoming and outgoing traffic can be mentioned as the third problem.

For the bidirectional use of an optical fibre, the incoming and outgoing traffic will have to be split and combined at both ends thereof. The simplest conventional solution is to use a 50/50 splitter. However, this produces a loss of 6 dB (a factor of 4) in signal for both directions, specifically 3 dB at the beginning as a result of the combination and 3 dB at the end as a result of splitting. A more advanced conventional solution is to use an optical fork circuit in the form of a circulator. In a circulator having, for example, three ports, all the light which is applied to the first port is output at the second port. The light applied to the second port can only be tapped off at the third port. For the desired combination and separation, the optical fibre can then be connected to the second port, while the transmitter can be connected to the first port and the receiver to the third port.

A circulator is in general based on the Faraday effect and comprises a Faraday polarisation rotator, two polarisation splitters, two mirrors and a half-lambda retarder, the alignment being very critical because of the splitting and combination of light paths.

In principle, an average person skilled in the art is able to arrive at the idea of combining the solutions mentioned above. This combination produces, however, an extensive and complex optical circuit for a transmitting and receiving system. In addition, an accumulation of attenuations of the various components occurs.

BRIEF DESCRIPTION OF THE DRAWING

The invention will be explained in greater detail below with reference to the drawing, the single FIGURE of which is a circuit block diagram of a preferred embodiment of the invention.

DESCRIPTION OF THE PREFERRED EMBODIMENT

In the embodiment shown by way of example in the drawing, only two polarisation splitters and one nonreciprocal polarisation rotator are used to eliminate the three problems mentioned above. Said rotator may be formed by a Faraday rotator.

The light signal originating from the transmitter Z, which incorporates a laser, is applied from the output u11 to the first polarisation splitter PBS1, whose output i1 is connected to the input of the nonreciprocal polarisation rotator R. The other output u12 of the first polarisation splitter PBS1 is connected to the input of the receiver O1, while the signal from the local oscillator LO is also applied to said receiver O1. The output of the nonreciprocal polarisation rotator R is connected to an input u21 of the polarisation splitter PBS2, while a separate output u22 of the latter is connected to the input of the receiver O2. The signal from the local oscillator LO is also applied to said receiver. In the drawing it is indicated as an example that the signal from the local oscillator LO is supplied via optical coupling devices K to the receivers O1 and O2. An optical fibre can then be connected to a bidirectional port i2 of the second polarisation splitter PBS2.

In this embodiment, the polarisation rotation of the nonreciprocal polarisation rotator R in the return direction, shown by the lower arrows in the drawing, is equal to the difference between the polarisation directions at the inputs of the polarisation splitters. In practice, with a Faraday rotator having a particular polarisation rotation in the return direction, the polarisation splitters are adjusted so as to meet the abovementioned requirement. The polarisation of the return signals, in particular of the undesirable reflections, is always rotated in the direction of the transmitter in such a way that the transmitter is ideally isolated from the reflections. As a result of the said adjustment, the transmission of the signal received from the system connection to the receiver(s) is precisely a maximum. Preferably, a nonreciprocal polarisation rotator having a rotation of 45° is used in this case as shown in the drawing. Specifically, the 6 dB loss can be completely avoided in this case, and the transmission in the transmitting direction is therefore also ideal.

It is clear that the invention implements the three solutions/functions in a simple optical circuit.

In the forward direction, that is to say from the transmitter to the optical fibre, the embodiment according to the invention operates in the same way as the known optical circulator in the forward direction. The total amount of light is transmitted. In the reverse direction (from the optical fibre to the transmitter), one polarisation component is split off by the polarisation splitter PBS2. The other component passes through the nonreciprocal polarisation rotator R and is then split off by the first polarisation splitter PBS1. In the reverse direction, the embodiment according to the invention therefore operates in the same way as a polarisation splitter which is used in a known manner as polarisation diversity hybrid.

If for example the polarisation direction of the polarisation splitter PBS2 is 45° and the light signal received has a polarisation of 45°, said signal is split off completely to the receiver O2 by the polarisation splitter PBS2. However, if the polarisation of the received light differs from 45°, a portion of said signal will be split off to the receiver O2, while the residual portion, having a polarisation of −45°, is applied to the polarisation rotator. The said rotator rotates the signal to 0°, with the result that the residual portion of the received light signal reaches the receiver O1 at full intensity via polarisation splitter PBS1. However, no light is transmitted to the transmitter. The signals received are detected by the coherent receivers O1 and O2 and demodulated, and then need also to be summed as is usual n a polarisation diversity system in order to obtain the final received signal. A summing circuit S is accordingly shown in the drawing.

Because the light signal cannot reach the transmitting laser in any way in the reverse direction, said laser is therefore isolated from optical reflections. In addition, hardly any optical loss occurs in both directions.

It is preferable to design the connection between the output u11 of the transmitter Z and the first polarisation splitter PBS1 and/or between at least one of the receivers O1 and O2 and the separate outputs u12 and u22, respectively, of the second polarisation splitter PBS2 as polarisation-maintaining optical fibre.

I claim:

1. An optical transmitting and receiving system for connection to an optical bidirectional transmission path and comprising a transmitter, a receiving circuit and a hybrid circuit, said hybrid circuit having a bidirectional port connected to the transmission path, an outgoing input connected to the transmitter and at least one unidirectional incoming output connected to the receiving circuit, wherein the hybrid circuit is constituted by a fine polarisation splitter, (PBS1), a nonreciprocal polarisation rotator (R) and a second polarisation splitter (PBS2), a first incoming output (u11) of the first polarisation splitter (PBS1) serving as the transmitting input of the hybrid circuit and the second polarisation splitter (PBS2) having a bidirectional port (2) serving as the bidirectional port of the hybrid circuit and the outgoing input and output of the nonreciprocal polarisation rotator (R) being respectively connected to an incoming input (i1) of the first polarisation splitter (PBS1) and to a first incoming output (u21) of the second polarisation splitter (PBS2), and wherein the receiving circuit comprises two coherent receivers (O1, O2) connected to a local oscillator (LO) and the inputs of the coherent receivers are respectively connected to second outputs of the first and second polarisation splitters (PBS1, PBS2), the outputs of the coherent receivers being connected to a summing circuit (S) for obtaining a received signal.

2. The transmitting and receiving system according to claim 1, wherein the polarisation rotation of the nonreciprocal polarisation rotator in the return direction is equal to the difference between the polarisation directions at the inputs of the polarisation splitters.

3. The transmitting and receiving system according to claim 2, wherein the rotation of the nonreciprocal polarisation rotator is 45°.

4. The transmitting and receiving system according to claim 1, wherein the connection between the transmitter and the first polarisation splitter is a polarisation-maintaining optical fibre.

5. The transmitting and receiving system according to claim 1, wherein at least one of the connections respectively between the second outputs of the first and second polarisation splitters and the inputs of the coherent receivers is formed by a polarisation-maintaining optical fibre.

6. The transmitting and receiving system according to claim 2, wherein the connection between the transmitter (Z) and the first incoming output of the first polarisation splitter (PBS1) is a polarisation-maintaining optical fibre.

7. The transmitting and receiving system according to claim 2, wherein at least one of the connections respectively between the second outputs of the first and second polarisation splitters and the inputs of the coherent receivers is formed by a polarisation-maintaining optical fibre.

8. The transmitting and receiving system according to claim 3, wherein the connection between the transmitter and the first incoming output of the first polarisation splitter is a polarisation-maintaining optical fiber.

9. The transmitting and receiving system according to claim 3, wherein at least one of the connections respectively between the second outputs of the first and second polarisation splitters and the inputs of the coherent receivers is formed by a polarisation-maintaining optical fibre.

* * * * *